July 3, 1956  R. E. VERNON ET AL  2,752,981
INNER TUBE AND VALVE
Filed June 17, 1953

INVENTOR.
JOHN J. HOESLY
BY ROY E. VERNON
ATTORNEY

United States Patent Office 2,752,981
Patented July 3, 1956

2,752,981

INNER TUBE AND VALVE

Roy E. Vernon and John J. Hoesly, Akron, Ohio, assignors, by mesne assignments, to The Goodyear Tire & Rubber Company, a corporation of Ohio Application June 17, 1953, Serial No. 362,178

1 Claim. (Cl. 152—429)

This invention relates to valves and more particularly to the composition of the rubber parts of valves which are used in inner tubes for pneumatic tires. The invention also relates to improved valve constructions and to the improved inner tubes obtainable by the use of the improved valve constructions.

The conventional type of valve assembly employed in inner tube construction is normally made up of an inner metallic insert covered peripherally with a body of rubber which is flared out to form a base portion. The rubber base portion of the valve assembly is adhered to the insert so that when the assembly is built into the inner tube, the valve assembly, through the rubber base portion, becomes an integral part of the inner tube.

Most of the inner tubes presently being produced are made from a synthetic rubber known as butyl rubber which is made by the polymerization of a major proportion of an iso-olefin containing from 4 to 7 carbon atoms, such as isobutylene, and a minor proportion of a multi-olefin containing from 4 to 8 carbon atoms, such as butadiene or isoprene. Because it is difficult to adhere butyl rubber to other rubbers, it has heretofore been the practice to employ a butyl rubber compound in the stem and base of the valve assembly also in order to insure that the base will adhere to and be vulcanized to the body of the inner tube which is made from butyl rubber. The use of butyl rubber in the valve assembly causes difficulties which develop after a pneumatic tire containing such an inner tube is punctured. When a tube mounted on a tire is punctured or blows out the deflation of the tube causes a looseness of the tire on the rim, thus, permitting it to move circumferentially relative to the rim under the braking or driving forces. This, in turn, causes a similar circumferential movement of the tube which puts a strain on the valve causing it to tilt in the valve hole of the rim and, if the valve sticks without pulling free of the hole, the valve may be torn or ruptured due to the shearing forces set up by this circumferential movement. This damage to the valve must, of course, be repaired before the tube is replaced in the assembly, and this damage is quite often so severe that no repair is possible. Because of the inherent properties of butyl rubber, a valve whose rubber parts are made of butyl rubber is more easily damaged than is a similar valve made of natural rubber.

It is, therefore, an object of this invention to provide a composition for the rubber portion of the valve assembly which composition will provide satisfactory adhesion between the base of the valve and the body of the inner tube while at the same time substantially improving the resistance of the valve assembly to rupture and tear.

It is a further object of this invention to provide an inner tube construction which will permit greater running time of the assembly after puncture and before irreparable damage has been done to the tube by the rupture or tearing of the valve assembly. Other objects will appear as the description proceeds.

The objects of this invention are accomplished by providing an improved tear-resistant composition to be used for the rubber portion of the valve assembly and particularly the stem portion thereof.

The invention will be more readily understood with reference to the accompanying illustrative drawings, in which.

Figure 1:
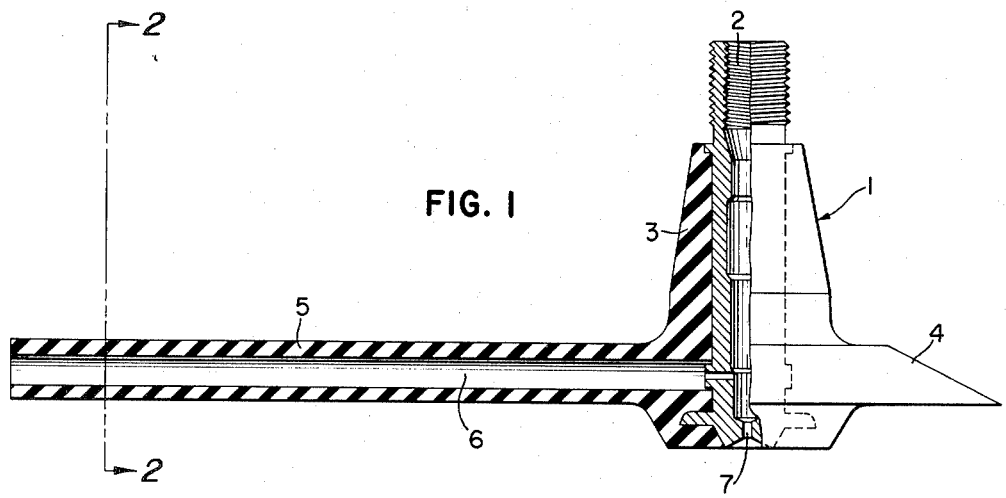
Fig. 1 is an elevation, partly in section, showing a valve assembly of the type used in dual-chambered inner tubes.

Referring to the drawing, Fig. 1 thereof shows a valve assembly 1 with its metallic insert 2 partly covered by a rubber body 3 having a base 4 made from a rubber-like composition. The valve assembly 1 shown is of the type commonly used in dual-chambered inner tubes and consequently has an extension 5 of the base 4 with an additional air passage 6 provided therein for the inflation of the outer chamber in a dual-chambered inner tube, such as in Patent 2,253,759 of Burkley. The inner chamber is inflated through passage 7.

Figures 3, 4:
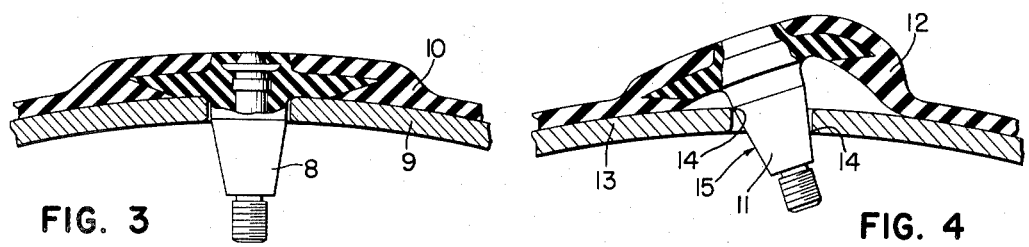
Fig. 3 is a fragmentary cross-sectional view showing the assembly of a rim, an inner tube, and the inner tube valve.
Fig. 4 is a view similar to Fig. 3 showing the assembly of Fig. 3 after a puncture has deflated the tire, and the tube has been circumferentially shifted, setting up tear stresses on the valve assembly.

Fig. 3 shows a conventional valve assembly 8 on a tire rim 9 with the valve 8 in the unstressed condition with respect to the body of the inner tube 10 which condition prevails while the tire and tube assembly are in normal operation. Fig. 4, on the other hand, shows the condition that sometimes develops, due to the shifting of the tube 12 circumferentially of the rim 13, after a puncture takes place. In Fig. 4 is indicated the position which the valve assembly tends to assume because of this circumferential shifting. The result is that the stem 11 of the valve assembly 15 is subjected to a shearing action developed at the sides 14 of the hole in the rim 13. Continued operation of the assembly under the conditions shown in Fig. 4 will eventually cause the valve assembly to tear or rupture.

Figure 2:
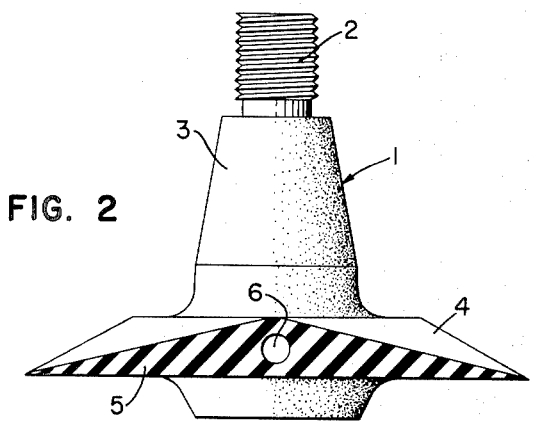
Fig. 2 is a section taken along the line 2—2 of Fig. 1.

While the embodiments shown in Figs. 1 and 2 illustrate valves used in multi-chambered inner tubes, it will be apparent that the invention is likewise applicable to the more conventional type valve employed in single-chambered inner tubes and is in fact applicable to valves in which there are short metallic inserts or no metallic inserts.

According to the practice of this invention and as illustrated in the drawings, a tear-resistant composition is provided for the rubber portion of the valve assembly. This tear-resistant composition is a blend of rubber-like materials comprising from 0.25% to 50% by weight of polychloroprene and from 99.75% to 50% by weight of a rubbery copolymer resulting from the polymerization of a major proportion of an iso-olefin and a minor proportion of a multi-olefin. The rubbery copolymers of the iso-olefin and multi-olefin are of the type known in the art as butyl rubber and have been described above.

The synthetic rubber blended with the butyl rubber is polychloroprene, commonly known as neoprene, and is a rubbery polymer of a 2-chlorobutadiene-1,3 or rubbery polymers of 2,3-dichlorobutadiene-1,3 or rubbery copolymers of a chlorobutadiene-1,3 with monomers copolymerizable therewith such as isoprene, butadiene-1,3, styrene, and acrylonitrile. Typical neoprenes are known to the trade as Neoprene GN, Neoprene KN, Neoprene I, GR–M and GR–M–10. The rubbery homopolymer of chloroprene itself is preferred for the purpose of this invention.

A preferred tear-resistant layer is obtained when the polychloroprene is used in an amount ranging from 3% to 25% by weight of the blend while a particularly useful tear-resistant layer is obtained by the use of 5% to 20% by weight of polychloroprene.

It should be understood that the percentages by weight being discussed are based only upon the rubber content of the compound being used and that in computing these percentages the other conventional compounding ingredients, such as carbon black, plasticizing oils, antioxidants and curing agents have not been taken into account.

As is shown in the accompanying drawings, the improved tear-resistant composition is molded and vulcanized to the metallic insert. This vulcanization is preferably only a partial vulcanization for the reason that the completed valve assembly is to be subsequently vulcanized to an uncured tube. It has been found that the use of the tear-resistant composition of this invention in the stem and base portions of the valve assembly results in satisfactory adhesion between the metallic insert of the valve and the rubber valve body thereof and also results in satisfactory adhesion between the base portion of the valve assembly and the body of the inner tube.

It is to be understood that while the improved composition of this invention is particularly useful with inner tubes which comprise or consist of butyl rubber, it is likewise useful in inner tubes made of natural rubber or the elastomeric copolymers of butadiene and styrene.

Shown below is the recipe for a compound useful in the practice of this invention. Parts are shown by weight:

| | |
|---|---|
| Butyl rubber | 95.00 |
| Polychloroprene | 5.00 |
| Carbon black | 75.00 |
| Zinc oxide | 15.00 |
| Sulfur | 1.50 |
| Magnesium oxide | 5.00 |
| Mercaptobenzothiazole | .75 |
| Tetramethyl thiuram disulfide | .50 |

It should be understood that there are many variations of the above recipe, particularly in regard to the fillers, oils and curing agents which can be made without departing from the spirit and scope of this invention.

Eight inner tubes of the dual-chambered type, similar to those described in U. S. Patent 2,173,065, issued September 12, 1939, to Walter J. Lee, were constructed. Four of these inner tubes used a valve assembly of the type shown in Fig. 1 in which the rubber portion was constructed from an all-butyl rubber compound. The other four inner tubes were similarly constructed, using a compound of the type shown in the recipe above. All eight inner tubes were mounted in tires and run on test cars. The cars were traveling at a speed of 50 miles per hour when all eight inner tubes were punctured, at which time the speed was gradually reduced to 30 to 35 miles per hour. The test cars were then run on the tire and tube assemblies until the valve assembly ruptured. The four control tires using an all-butyl rubber stock in the base and stem of the valve assembly ran for an average of only 12 seconds after puncture before the valves ruptured, whereas, the four tubes using the compound shown in the above recipe for the stem and base of the valve assembly ran more than twice as long for an average of 30 seconds after puncture and before failure. It will thus be seen that the practice of this invention permitted an increase of 150% in running time after puncture and before failure.

While certain representative embodiments and details have been shown for the purpose of illustrating the invention, it will be apparent to those skilled in this art that various changes and modifications may be made therein without departing from the spirit or scope of the invention.

We claim:

In the combination of (1) a pneumatic inner tube formed from the rubbery copolymer resulting from the polymerization of a major proportion of an iso-olefin containing from 4 to 7 carbon atoms and a minor proportion of a di-olefin containing from 4 to 8 carbon atoms and (2) a valve containing a rubber body cover portion and a rubber base portion secured to said inner tube, the improvement which comprises the use in the rubber body cover portion and base portion of said valve of a blend of rubber-like materials comprising from 0.25% to 50% by weight of polychloroprene and from 99.75 to 50% by weight of a rubbery copolymer resulting from the polymerization of a major proportion of an iso-olefin containing from 4 to 7 carbon atoms and a minor proportion of a di-olefin containing from 4 to 8 carbon atoms.

References Cited in the file of this patent

UNITED STATES PATENTS

| | | |
|---|---|---|
| 2,513,817 | Pennington | July 4, 1950 |
| 2,519,231 | Crawford | Aug. 15, 1950 |
| 2,540,596 | Rehner et al. | Feb. 6, 1951 |
| 2,541,550 | Sarbach et al. | Feb. 13, 1951 |